July 25, 1967 G. L. CLAPPER 3,333,249

ADAPTIVE LOGIC SYSTEM WITH RANDOM SELECTION, FOR CONDITIONING, OF TWO OR MORE MEMORY BANKS PER OUTPUT CONDITION, AND UTILIZING NON-LINEAR WEIGHTING OF MEMORY UNIT OUTPUTS

Filed June 29, 1964 5 Sheets-Sheet 1

INVENTOR
GENUNG L. CLAPPER
BY Paul M. Bronner
AGENT

ADAPTIVE LOGIC SYSTEM WITH RANDOM SELECTION, FOR CONDITIONING, OF TWO OR MORE MEMORY BANKS PER OUTPUT CONDITION, AND UTILIZING NON-LINEAR WEIGHTING OF MEMORY UNIT OUTPUTS

Filed June 29, 1964

July 25, 1967 G. L. CLAPPER 3,333,249

ADAPTIVE LOGIC SYSTEM WITH RANDOM SELECTION, FOR CONDITIONING, OF TWO OR MORE MEMORY BANKS PER OUTPUT CONDITION, AND UTILIZING NON-LINEAR WEIGHTING OF MEMORY UNIT OUTPUTS

Filed June 29, 1964 5 Sheets-Sheet 5

United States Patent Office 3,333,249
Patented July 25, 1967

3,333,249

ADAPTIVE LOGIC SYSTEM WITH RANDOM SELECTION, FOR CONDITIONING, OF TWO OR MORE MEMORY BANKS PER OUTPUT CONDITION, AND UTILIZING NON-LINEAR WEIGHTING OF MEMORY UNIT OUTPUTS

Genung L. Clapper, Vestal, N.Y., assignor to International Business Machines Corporation, New York, N.Y., a corporation of New York Filed June 29, 1964, Ser. No. 378,807
11 Claims. (Cl. 340—172.5)

ABSTRACT OF THE DISCLOSURE

An adaptive logic system in which two or more banks of memory units are provided for each output condition, the banks being connected in multiple to the input circuitry, each memory unit in the banks having non-linear weighting of its outputs with respect to each other and to the null condition of the memory units. The memory banks in a group are selected at random for conditioning.

Figure 1:
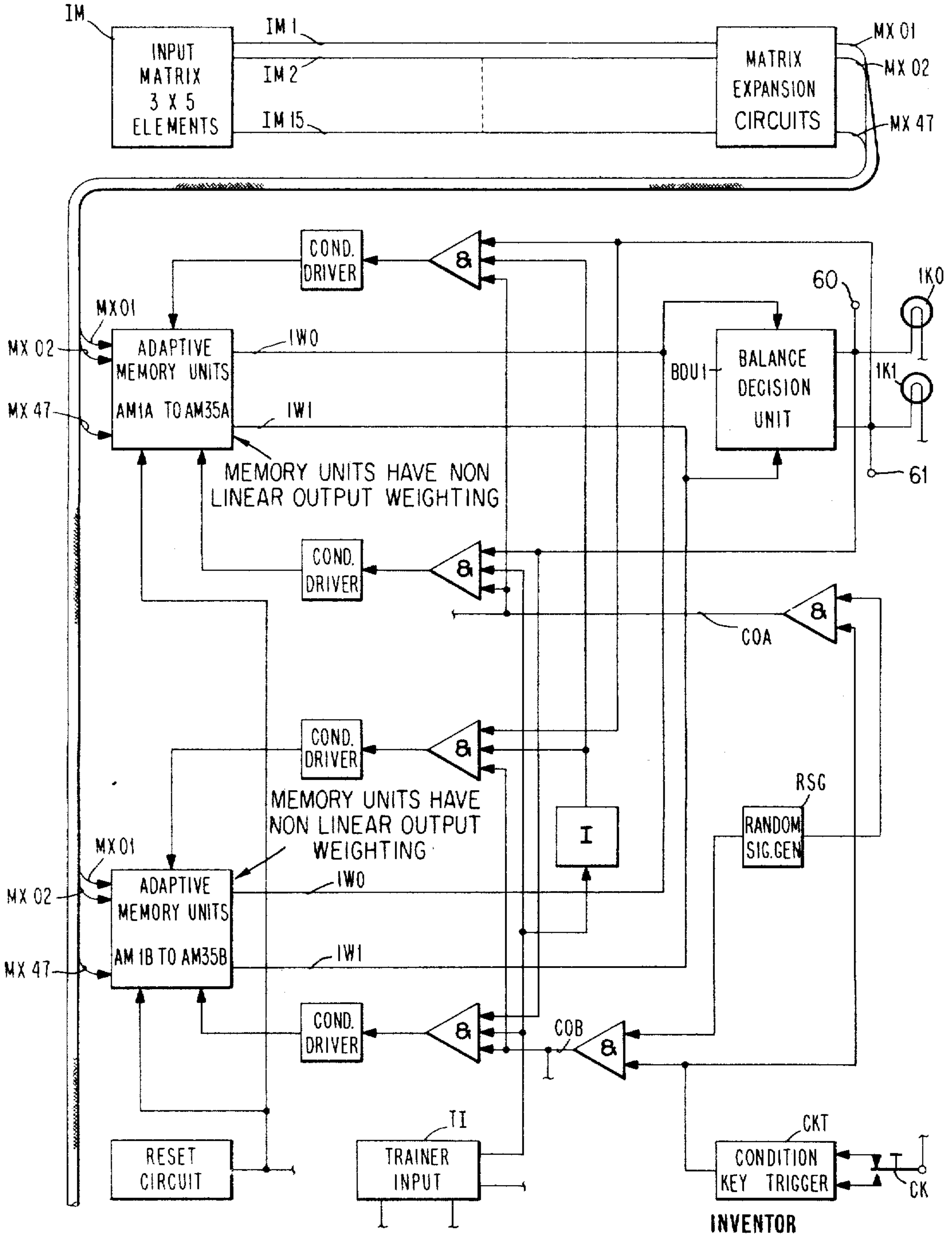

This invention relates to adaptive logic systems and particularly to an improved adaptive logic system utilizing adaptive memory banks which are arranged to handle information on a parallel basis, with random selection of the banks. The memory units employed in the banks can also have a non-linear weight assignment, so that the random parallel conditioning of these units provides a large increase in the number of weight values, compared with previous systems.

Adaptive logic systems are generally constituted in such manner that a learning or training cycle is used to condition the system to respond to given inputs with desired outputs.

Initially, the system may have a null or an inchoate response, since such systems usually comprise a large number of multistate adaptive memory units, and initiation of training can find the system in a null condition or any of a number of random conditions, depending on the setting of the memory units.

During training, successive inputs are supplied to the system and the desired outputs are also supplied to the system. Suitable means detects the disparity, if any, between the input and output and acts in the direction to correct the disparity. The inputs are again presented, and disparities between input and output are successively corrected. These training cycles, or conditioning runs, as they may be called, are repeated until the system clearly distinguishes, without error, each set of input information which is to provide a given output.

In a copending application, Ser. No. 331,832, filed on Dec. 19, 1963, by me, for Adaptive Logis System, now U.S. Patent No. 3,284,780, issued Nov. 8, 1966, there is disclosed and claimed an adaptive logic system utilizing a plurality of banks of adaptive memory units, one such bank being provided for each desired output function, and each bank containing as many adaptive memory units as there are input functions. Each bank of memory units is supplied with suitable conditioning signals during its training cycle and the weight outputs are indicated by balance decision units which indicate the magnitude and direction of the weight; i.e., positive, or negative, or zero, all as explained in detail in the cited application.

It has been found that the number of effective weight increments can be greatly increased by non-linearly weighting the outputs of adaptive memory units similar to those disclosed in the prior application, and then arranging parallel banks of such units to be conditioned in random manner.

Merely paralleling the units and conditioning in parallel does not increase the effective weight assignments, but only doubles the weight steps over what one unit would produce. The net effect is to lower the system impedance at the input of the balance decision units, so that there is no gain in weight increments, only an increase in redundancy, which would result only in an increased reliability, as would be expected.

However, if two memory banks with non-linearly weighted memory units are connected with their inputs and outputs in parallel, but are separately and randomly conditioned, a considerable increase in available weight increments results.

Accordingly, it is a principal object of this invention to provide an improved adaptive logic system in which a plurality of adaptive memory units having non-linear outputs are conditioned in randon fashion.

Another object of the invention is to provide conditioning of an adaptive logic system on a random basis.

A further object of the invention is to provide an adaptive logic system in which a plurality of memory banks having common inputs and outputs are conditioned by a random selection process.

Still another object of the invention is to provide an improved adaptive logic system which provides many increments of weight even when employing adaptive memory units having relatively few weighted outputs.

A further object of the invention is to provide an improved adaptive logic system employing adaptive memory units having non-linear weighting of the outputs.

Briefly described, the present invention contemplates an adaptive logic system in which suitable input signals are supplied to a plurality of adaptive memory banks. These adaptive memory banks each comprise a plurality of metastable devices which have a null or neutral state from which they may be conditioned to one or more active states on each side or in either direction from the null or neutral condition, the number of such units being determined by the total number of inputs and the number of desired output conditions which are to be indicated. Such displacement or conditioning causes the adaptive memory bank to supply, on an associated set of output lines, voltages which indicate the degree to which the memory unit has been conditioned from one side or the other of its neutral state. Equal outputs indicate that the bank is in the neutral state.

A plurality of at least two such banks are provided for each output condition which is desired for the system.

All of the outputs from the banks of memory units common to a particular output condition are supplied via a pair of common output lines to a balance decision unit which is arranged and constructed in such manner that it provides a ternary output indicative of the balance of outputs on the two weighted output lines; that is, both outputs will be provided if both of the weighted output lines are equal in their weight; that is, the voltage thereon. If the output lines are not balanced, the balance decision unit will so indicate the direction of unbalance.

The outputs from the balance decision units are fed back through conditioning circuits to the adaptive memory units with appropriate reversal of connections so that departure from a given output conditions the memory unit toward that output. The present invention specifically provides means for randomly selecting one of the banks associated with an output condition for a conditioning input, by randomly connecting the conditioning inputs of the memory banks to the common conditioning circuits.

Also, each of the adaptive memory units comprising the memory banks is arranged so that the weighted value of its outputs for its active states on either side of the null condition are a non-linear function. Such nonlinearity of the output weights, taken with the random conditioning selection, provides a greatly increased number of weight increments, as will be subsequently explained.

The foregoing and other objects, features and advantages of the invention will be apparent from the following more particular description of several preferred embodiments of the invention, as illustrated in the accompanying drawings.

In the drawings:

FIG. 1 is a diagrammatic view showing the entire system in simplified fashion.

Figure 2A:
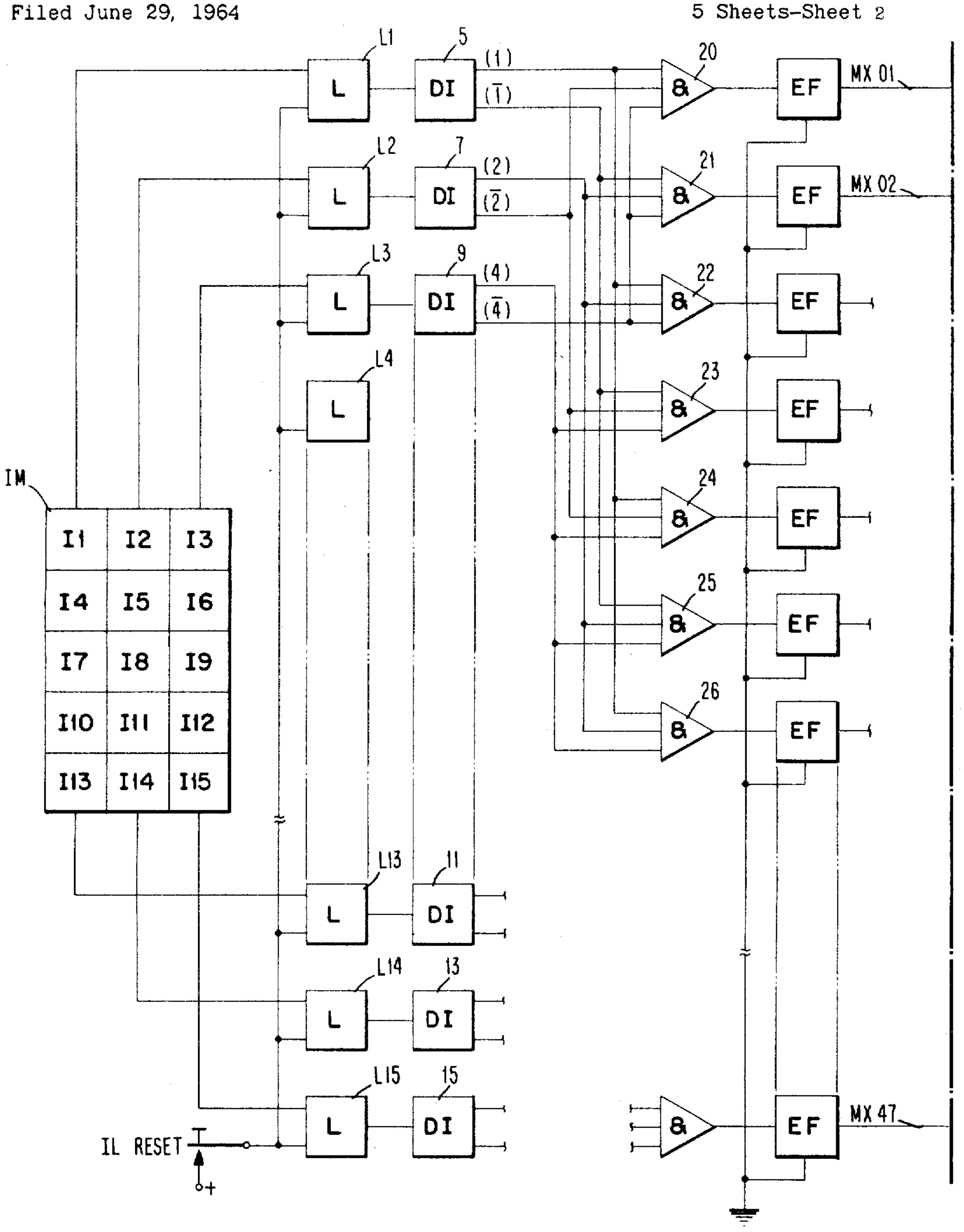
Figure 2B:
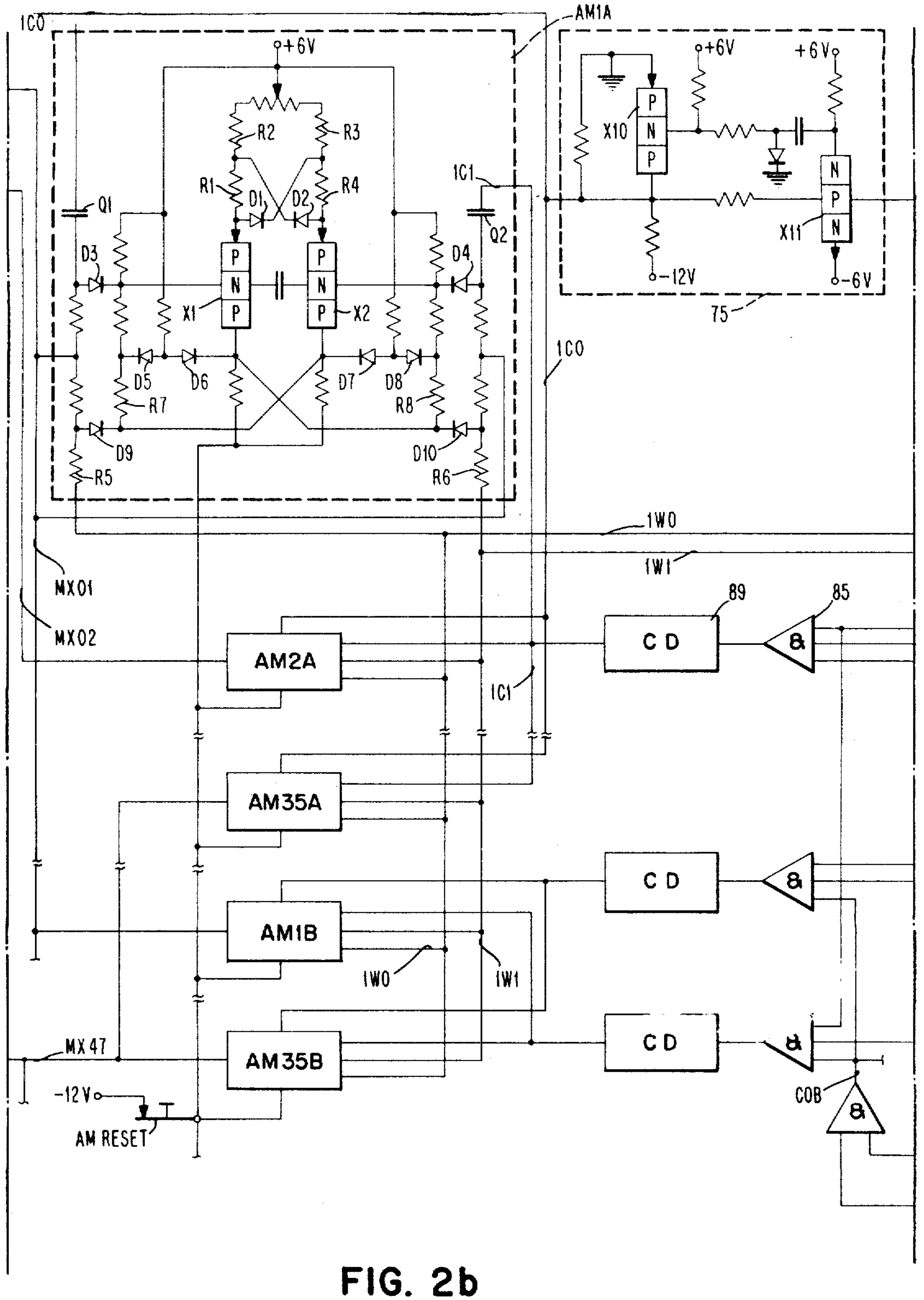
Figure 2C:
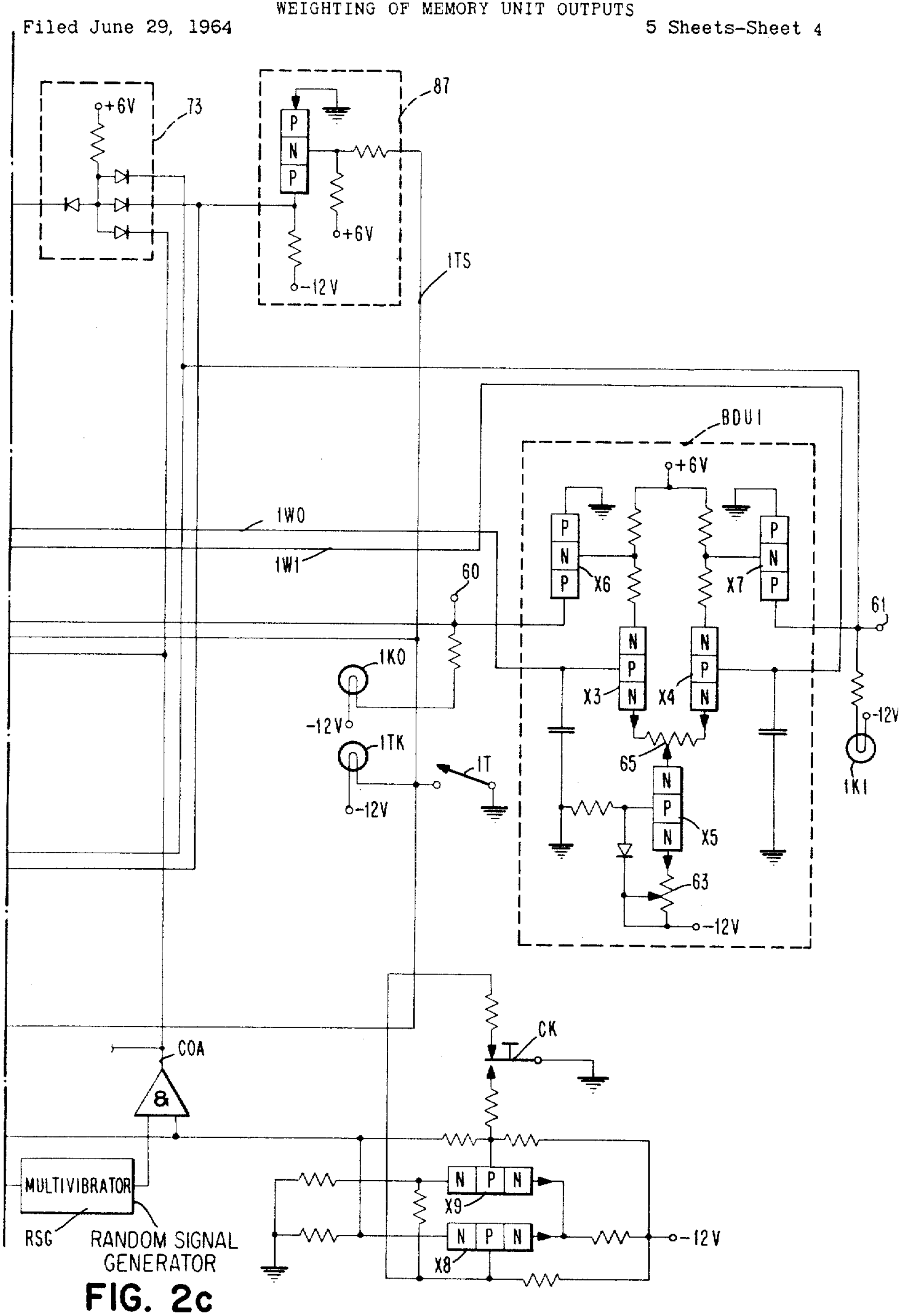

FIGS. 2*a*, 2*b* and 2*c*, placed side by side, in the order named, are diagrammatic views in more detail of an adaptive logic system employing one embodiment of the invention.

Figure 3:
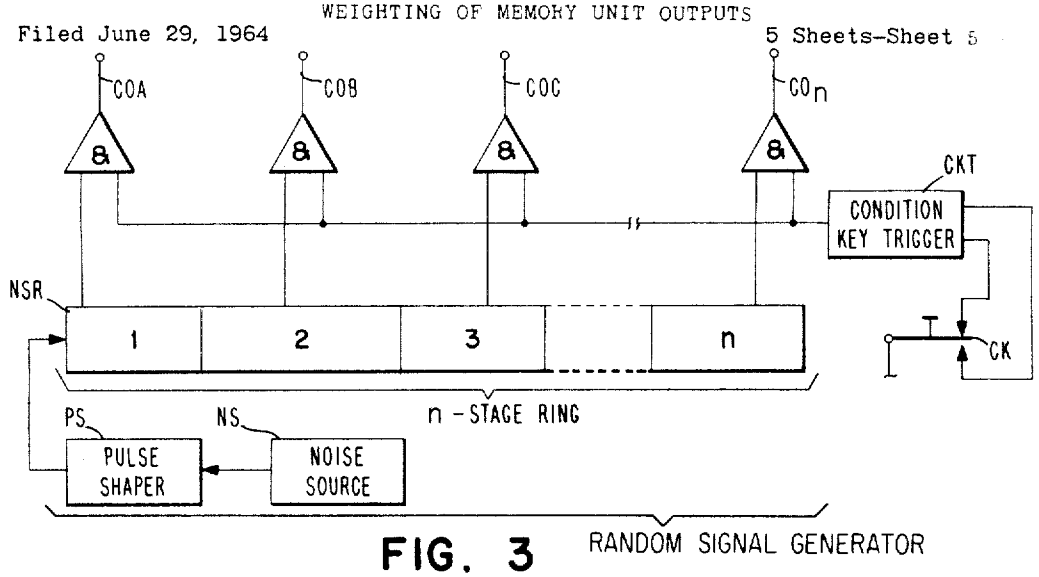
Figure 4:
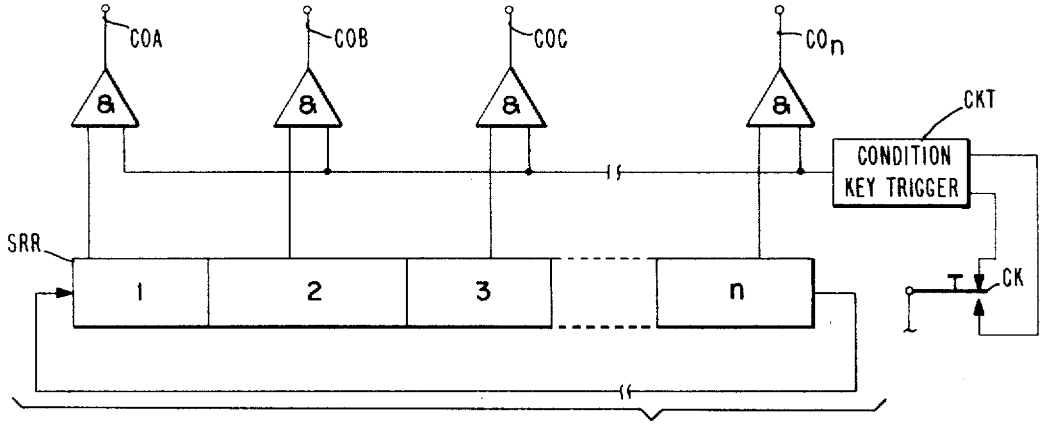

FIGS. 3 and 4 are diagrammatic views of random signal generators which may be employed when the adaptive memory units are divided into more than two banks for each output condition, to provide other embodiments of the invention.

Referring to the general view shown in FIG. 1 of the drawings, the input to the system is derived from an input matrix IM which may have, for example, 15 elements arranged in rows of three and columns of five, from which 15 output lines, such as the lines IM1, IM2, through IM15 are supplied, these lines having signals thereon when the associated one of the elements in the input matrix is active. These input lines are connected to the matrix expansion circuits, to be later described, in which output signals are derived for the various combinations of inputs supplied thereto. These expanded or transformed outputs are designated by coded numbers, three of which are indicated as MX01, MX02 and MX47. Such outputs are supplied in parallel to a plurality of banks of adaptive memory units, only two such banks being shown in FIG. 1, the remainder being arranged in similar fashion. In the system herein shown and described, two such banks of adaptive memory units are provided for each output condition which is to be indicated and each of the banks contains a number of adaptive memory units equal to the number of inputs supplied thereto from the matrix expansion circuits. For example, the first bank of adaptive memory units contains adaptive memory units AM1A through AM35A, and the second bank contains units AM1B through AM35B. These two banks are associated with the first output condition, which can be any given function, but as herein shown, is considered as the units order or position of a binary number. The remaining banks are not shown, since they would be arranged in the same manner. As can be seen from the drawings, the inputs are supplied in parallel to each of these two banks of memory units. Each memory unit in the bank is of a type which will be described in detail later, suffice it to say for the present that the memory unit, upon a supply thereto of suitable input and conditioning pulses, will provide an output on one or the other or both of a set of balanced output lines, depending upon whether or not the conditioning signals are such as to cause the memory unit to be displaced from one side or the other of a neutral condition.

The outputs from each of the adaptive memory units are supplied to a set of common output lines associated with the memory banks of a group, such as the lines 1W1 and 1W0. The voltages on these output lines will be balanced or equal or will be unbalanced in accordance with the condition of the input-activated memory units in the memory banks to which they are connected, Thus, the condition of the adaptive memory units is reflected in the balanced or unbalanced condition of the output signal lines whenever an input pattern is presented. It will be apparent that variations in circuit parameters and environmental conditions, power supply variations and so on, will cause the outputs to vary together so that they will still maintain the same relative condition with each other, thereby eliminating many deleterious influences present in the known single threshold systems.

The common output lines are connected parallel to the input of a balance decision unit, of which there is one for each set of memory banks, such as the unit BDU1. These balance decision units are sensitive voltage comparison devices, which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to the output terminal 60 associated with the indicator lamp 1K0, indicating that the zero condition is present for the output of the first memory bank. Conversely, if line 1W1 has a higher voltage than 1W0 an output signal will be supplied to the output terminal 61 and the indication lamp 1K1 will be lighted. In the event that the lines are balanced or nearly so within the tolerance of the balance decision unit, outputs will be present on both outputs from the balance decision unit and, therefore, both output indicator lamps 1K0 and 1K1 will be illuminated. Terminals are provided as shown, which may be connected to further units, not shown, including decoding and utilization devices for utilizing the information supplied from the adaptive memory system. Since the ultimate use of the information stored by the system is not germane to the structure and operation of the system itself, these further details have not been shown.

In order to condition the adaptive memory units, signals from a trainer input are supplied both in normal and inverted form to the adaptive memory banks via associated AND circuits and condition drivers as shown. In addition to the trainer inputs, the AND circuits are supplied with an input from the opposing output line of the balance decision unit as well as an input from a conditioning circuit which serves to render the condition drivers active only when desired and on a random basis. In operation, the trainer inputs are set for the desired output with a given input and, if the balance decision unit does not put out a signal of suitable value, the signal on the output line from the balance decision unit together with the inputs from the trainer input, and conditioning circuit, energize the appropriate condition driver, which is adapted to drive all of the memory units. The adaptive memory units accordingly have inputs supplied thereto to increase or decrease their weight as necessary. After the adaptive memory units have been suitably trained, it is then possible to present various input combinations thereto and have the adaptive memory units supply appropriate outputs to the output circuits that cause the desired output to be produced.

The memory banks are conditioned at random by virtue of a conditioning circuit which includes a conditioning key CK, a condition key trigger CKT, a random signal generator RSG, and two AND circuits governed jointly by the condition key trigger and the random signal generator. The random signal generator may be of any suitable type adapted to provide output signals which will effectively occur at random with respect to any of the memory banks and operation of the condition key trigger. Where only two banks of adaptive memory units per output condition are provided, a free running multivibrator with alternating outputs may be employed. For more than two positions, any type of random signal generator having a suitable number of random outputs may be employed, such as a continuously running ring circuit, for example.

In any case, the conditioning circuit will render either one of the adaptive memory banks of a pair susceptible to conditioning at any given time; and, since this selection is random, it provides random conditioning. In the case of more than two banks to a group, it may be desirable to condition any number on a random basis.

If the adaptive logic units have weighted outputs which are linearly related in each direction from their neutral state, their use in such a system would only double the total increments available at the input of the balance decision unit. For example, if a quinary-state trigger, such as described in U.S. patent application Ser. No. 334,397, filed Dec. 30, 1963 now U.S. Patent 3,286,103, issued November 15, 1966, is used, this unit, of itself, will provide five stable states including the null or neutral condition, which states may be designated as having weights +2, +1, 0, −1, −2. Used with random selection, the combined increments can have the total values of +4, +3, +2, +1, 0, −1, −2, −3, −4.

Now assume the output weight values (which can be output currents, for example) are arranged in non-linear fashion; e.g., +5, +2, 0, −2, −5. Then the number of total increments is increased in a random selection system to the following weight values for two banks per output: +10, +7, +5, +4, +3, +2, 0, −2, −3, −4, −5, −7, −10.

For three banks per output condition, we obtain: +15, +12, +10, +9, +8, +7, +6, +5, +4, +3, +2, +1, 0, −1, −2, −3, −4, −5, −6, −7, −8, −9, −10, −12, and −15.

Four banks per output position will provide thirty-five graduations or weight increments: ±20, ±17, ±15, ±14, ±13, ±12, ±11, ±10, ±9, ±8, ±7, ±6, ±5, ±4, ±3, ±2, ±1 and 0.

Thus, by using random conditioning and non-linear weight assignments, a substantial increase in total available increments is involved, but only a few stable states are required in each individual adaptive memory unit. At the same time, the benefits of redundancy are retained, since there are several ways to obtain all of the weight values, except the extreme values.

Referring now to the detailed drawings, FIGS. 2*a*, 2*b*, and 2*c*, taken together in the order named, the input to the system is considered to be derived from a plurality of input devices which may be arranged in matrix fashion designated by the reference character IM denoting input matrix. The matrix shown is a 3-by-5 matrix; i.e., three elements per row and five rows. However, it is to be understood that any number of rows and columns could be utilized. Each of the input elements is distinctively labeled as shown, I1, I2, I3, I4, etc. These elements may be, for example, photocells arranged in a matrix for detecting a pattern projected thereon. The outputs from each input element in the matrix IM; i.e., the elements I1 through I15, inclusive, are supplied as inputs to latch or trigger storage circuits indicated by the rectangles, designated with the letter L, and with the reference characters L1 through L15, only seven of which are shown. These latches are of conventional construction and arranged in such manner that an input thereto from the associated input element of the input matrix will cause the latch to be set ON and the latch will remain in its ON condition unless and until the input latch reset button IL RESET is depressed, at which time energy is supplied to the reset circuits of all of the latches to restore them to their normal or OFF condition. The input latches L1 through L15, accordingly, serve as an input storage medium which provides input information to the subsequent circuitry. It should be noted that, if the input from the matrix is persistent, the latches can be eliminated.

Each of the input latches L1 through L15 have associated therewith a double inverter such as the ones indicated by the rectangles with the designation DI, reference characters 5, 7, 9, 11, 13 and 15, which constitute six out of the total of fifteen which would be provided in the arrangement shown. Each of the double inverters is arranged in a conventional manner to provide a normal and inverted output on the two output lines associated therewith. For example, the output lines associated with the double inverter 5 are designated by the reference characters (1) and $\overline{1}$, indicating respectively an output line on which the value 1 is indicated and another output line in which the value of $\overline{1}$ is indicated. When no signal is supplied to the double inverter from the associated latch, the negative output line is energized and, when a signal is supplied from the latch, the positive output line is energized. Similar outputs are provided on each of the fifteen inverters. In accordance with binary coding notation, the first three inverters 5, 7 and 9 have the output lines 1, 2 and 4 and their negatives provided therefrom. This is in accordance with the binary weighting for the first row of the input matrix, and the remainder of the output lines from the double inverters would be arranged in similar fashion as illustrated by the following table:

| Input matrix, element: | Binary equivalent (output of D1) |
|---|---|
| 1 | 01–$\overline{01}$ |
| 2 | 02–$\overline{02}$ |
| 3 | 04–$\overline{04}$ |
| 4 | 04–$\overline{11}$ |
| 5 | 12–$\overline{12}$ |
| 6 | 14–$\overline{14}$ |
| 7 | 21–$\overline{21}$ |
| 8 | 22–$\overline{22}$ |
| 9 | 24–$\overline{24}$ |
| 10 | 31–$\overline{31}$ |
| 11 | 32–$\overline{32}$ |
| 12 | 34–$\overline{34}$ |
| 13 | 41–$\overline{41}$ |
| 14 | 42–$\overline{42}$ |
| 15 | 44–$\overline{44}$ |

The double inverters provide outputs which are combined in a plurality of AND circuits to provide in the present case seven expanded input or transformed input signals for each three element matrix row. Since each row of the matrix is expanded in similar fashion, only the detailed arrangement for expansion of the first row will be considered. As shown, there are seven AND circuits 20 through 26 provided, each having three inputs thereto and having a single output which is energized when and only when a signal is provided at each of the three inputs to the particular AND circuit. These AND circuits are connected so that they represent all of the possible combinations of outputs from the double inverters 5, 7 and 9 except the null combination; that is, the combination which exists when all of the negative output lines of the three inverters are energized, this corresponding to a condition in which none of the inputs in the matrix have been energized. For instance, an AND circuit 20 provides an output when there has been an input combination constituting a 1 and $\overline{2}$ and $\overline{4}$ condition for the first row, so that a prefix 0 would be used. This indicates an input to the first element of the first row but no input to the second and third element of the first row. The relationship of the remaining AND circuits in the first expansion for the first row of the input matrix are indicated in tabular form below.

| Inputs from double inverters: | Output from AND circuit |
|---|---|
| 01–$\overline{02}$–$\overline{04}$ | MX01 |
| $\overline{01}$–02–$\overline{04}$ | MX02 |
| 01–02–$\overline{04}$ | MX03 |
| $\overline{01}$–$\overline{02}$–04 | MX04 |
| 01–$\overline{02}$–04 | MX05 |
| $\overline{01}$–02–04 | MX06 |
| 01–02–04 | MX07 |

The outputs from the AND circuits 20 through 26 are supplied through suitable emitter followers as designated by the rectangles enclosing the reference characters EF, these being provided with a suitable gating input common to all of the emitter followers and grounded as shown. Thirty-five of the emitter followers EF are provided in the system, for each of the possible matrix expansion outputs from the matrix expansion circuitry. The outputs of the emitter followers are designated by the reference character MX followed by a code designation indicating, first, the row and, second, the binary number designation on that particular line as indicated in the foregoing table. Only three examples of these outputs are shown, MX01, MX02 and MX47, which are respectively the binary one output from the zero row or topmost row of the matrix, the binary two output from the zero or topmost row of the matrix and the binary seven output from the fourth or lowermost row in the matrix, the rows being numbered 0, 1, 2, 3, 4, from top to bottom. The relationship between the outputs of all of the various elements of one row of the matrix and all of the output lines from the matrix expansion circuitry emitter followers for that row is illustrated in the following table:

| Active matrix element/s: | Transformed output |
|---|---|
| I1 | MX01 |
| I2 | MX02 |
| I3 | MX04 |
| I1, I2 | MX03 |
| I1, I3 | MX05 |
| I2, I3 | MX06 |
| I1, I2, I3 | MX07 |

A single transformed output is produced for the expansion of active elements in each row of the matrix. Thus, five out of the thirty-five output lines will be active for input patterns having elements in five rows of the input matrix.

The 35 ouput lines from the matrix expansion circuits are carried in multiple to each one of a plurality of pairs of banks of adaptive memory units, each bank having 35 units therein corresponding to the 35 matrix expansion lines. The number of pairs or groups of banks is determined by the number of binary outputs by which it is desired to indicate the output conditions for a given set of input conditions supplied to the input matrix.

As shown in FIG. 2*b*, the adaptive memory unit AM1A includes the apparatus shown in detail in the dotted rectangle designated AM1A. These units are also disclosed and claimed in U.S. Patent 3,286,103 referred to above.

Each of the memory units includes a pair of PNP transistors, such as X1 and X2, together with a plurality of diodes such as the diodes D1 through D10, and resistive and capacitive elements which, in combination, form a metastable storage device having a neutral or reset state and having a plurality of settable conditions in either direction from the neutral state. In the present instance, there are two stable states on either side of the neutral state so that, in effect, an adaptive memory device in the present arrangement has five stable states. Each of the memory units, such as AM1A, has an activating input which is supplied from the matrix expansion circuits, such as the line MX01. All other lines from the matrix expansion circuits are connected to the other adaptive memory units in that particular memory bank. The input from the matrix expansion circuits controls conditioning pulses to the 5-state trigger to move it from one state to another and also controls the application of the weighted outputs to the output lines. The diodes D3 and D4 are associated with the pair of gates controlling the conditioning in the arrangement shown and diodes D9 and D10 are associated with the gates controlling the summation of the weights on the output lines. The central part of the circuit is a 5-state trigger which is basically an Eccles-Jordan flip-flop modified to have three additional stable states by the use of diode pairs D1, D2; D5, D6; and D7, D8.

When power is supplied to the circuit, or following a resetting operation which is provided by operation of the reset key AMRESET, the diodes D1 and D2, which are cross-connected in the emitter circuits of the transistors X1 and X2, provide a stable mode at a midpoint or a neutral state for the trigger. At this time equal collector current flows in X1 and X2 and the voltage level at the collectors is equal at some predetermined potential, say, for example, at —4 volts. The emitters of X1 and X2 are also at equal voltage levels and the emitter impedance taps are at a higher level; that is, the intermediate taps between the resistors such as R1, R2 and R3, R4. Thus, D1 and D2 are both reverse biased. The emitter impedances are therefore not connected in parallel and, since the emitter impedance is greater than the collector impedance, the effective gain of each stage, that is, either side of the trigger, is less than unity. Thus, the circuit is stable at this point and the net weight applied to the balanced output lines from the unit will be considered to be zero since equal current flows in the resistors R5 and R6, which are connected to the common summation output lines for all of the memory units in both banks of the first pair and which are designated by the reference characters 1W0 and 1W1.

A conditioning pulse on the common conditioning line for zero conditioning for the first bank, namely, 1C0, supplied along with an input on the line MX01, will cause a positive transient to be supplied to the base of transistor X1 via capacitor Q1 and diode D3. This reduces the collector current of X1 and causes the collector voltage to start dropping towards some negative value, such as —12 volts, to which the collectors are returned. At the same time the emitter of transistor X1 starts rising toward +6 volts and the diode D1 will conduct. Increased current flowing in transistor X2 causes the collector voltage to rise until it is equal to the voltage at the divider tap in the impedance from the collector of transistor X1 to the base of X2, at which time the diodes D7 and D8 will conduct equally. With both diodes D7 and D8 conducting, a low impedance inverse feedback path is established from the collector of transistor X2 to the base thereof which stabilizes the trigger at a first stable condition on one side of the neutral point, where the voltage may be, for example, —6 volts at the collector of transistor X1 and —3 volts at the collector of transistor X2 with a difference therebetween of —3 volts. This might be indicated as the —2 weight condition. This condition is indicated on the summation lines because the current flowing to the summation line 1W0 is now greater than that flowing to the 1W1 line such the collector of transistor X2 is more positive than the collector of transistor X1. Another pulse on the condition zero line for the first memory bank; namely, 1C0, still in the presence of an input gate, would reduce the current in X1 still further. The collector of transistor X1 would drop to its lowest level, say for example, —9 volts, as transistor X1 approaches cutoff and X2 approaches saturation, raising its collector voltage to some value such as —1 volt. The trigger is now stable in a second condition on one side of the neutral point which might be designated as a —5 weight and therefore the current supplied to the 1W0 line is now a maximum of —5 units. Determination of such weight values is at least partly governed by the selection of suitable values for resistors R7 and R8.

The state of the trigger can now be changed to add increasing weight to the summation output line 1W1 by applying pulses to the condition 1 input line 1C1 at the time that a signal is present on the common input to the two sides of the trigger on line MX01. These inputs will be supplied to the base of transistor X2 via capacitor Q2 and diode D4 and the first pulse will move the trigger from the —5 weight condition to the —2 weight condition where diodes D7 and D8 would again stabilize the circuit. A second pulse on the line 1C1 will bring the trigger to its neutral state as originally described. A third pulse would bring the diode pair D5 and D6 into action and, as a result, the trigger will be set to a condition where the collector voltage for X1 will be at approximately —3 volts, whereas the collector voltage for the X2 will be at —6 volts. The difference between the voltage of the collector of X1 and the collector of X2 will be +3 volts and this may be designated as the +2 weight condition. A fourth pulse will cause the transistor X2 to approach cutoff and transistor X1 to approach saturation, which would then stabilize the trigger in a state where the collector voltage of X1 is approximately −1 and that for the collector of X2 is approximately −9, a difference of +8 volts, which may be considered a +5 weight for the trigger. Thus, the adaptive memory unit AM1A may be changed through its full range of five stable states and can be reversed as often as necessary by applying conditioning pulses to the appropriate line at the time that an input signal is present. Conditioning pulses are applied in common to all of the adaptive memory units in one bank of each pair when adaptation is necessary via random selection circuitry to be subsequently described. Only those adaptive memory units which are activated by inputs from the matrix expansion circuits will respond to such random conditioning. It should be noted that the units which do not have an input signal from the matrix expansion cannot change state at the time the conditioning pulses are applied nor do they effect the summation of weights on the summation output lines for their particular bank since the input lower level is below the lowest level that the collectors of the transistors in the adaptive memory unit can reach. Moreover, the units having zero weight; i.e., in their neutral state, cannot add to the net weight on the summation output lines in the presence of an input signal thereto because current flows equally into the summation output lines and, accordingly, the difference between the lines is not changed.

In order to determine the balance between the commoned summation output lines from each pair of banks of memory units, such as the balance between the lines 1W1 and 1W0, a plurality of balance decision units are provided, one for each pair of banks of memory units. In the present instance, since only two banks of memory units are shown, both associated with a single binary order output, there would be only one balance decision unit; namely BDU1. It will be understood that all such units employed in a system are similar and a detailed description of the balance decision unit BDU1 will suffice for all units in the system. The balance decision units examine the summation output lines from the memory units for balance or unbalance. When the memory is unconditioned so that all of the adaptive memory units are in their neutral state, the inputs to the decision unit will be alike and all patterns will give the intermediate or "don't know" response which could be considered a neutral state for the decision unit. The neutral state permits conditioning in either direction. After conditioning, the memory weights will sum up to give a learned response for particular input patterns and, in making a decision, no fixed threshold is used but a comparison is made between the zero and the one summation output lines; the line with the highest or most positive voltage determining the output. This determination is made by the balance decision unit comprising a sensitive voltage discriminator device which includes a pair of emitter-coupled transistors X3 and X4 with a transistor X5 acting as a constant current source to increase the sensitivity of the arrangement.

First, consider the case where no input pattern is present in the matrix so that the summation output voltages are the same. At this time transistors X6 and X7, which are connected in the collector circuits of X3 and X4, will conduct by virtue of the equal current distribution between the transistors X3 and X4. X5, acting as a constant current device, limits the current to a particular value, say for example, 3 milliamperes. This current divides equally between transistors X3 and X4 so that each conducts one half of the total; i.e. 1.5 milliamperes. With suitable circuit parameters then, a smaller current flows in the base circuits of the transistors X6 and X7 to bring these to saturation. Thus, in this present instance, an equality of the inputs to the decision unit is effective to energize both of the outputs. The outputs of the balance decision unit may be supplied to a suitable output terminal such as 60 and 61, and the outputs may also be indicated by suitable output indicator lamps such as the lamps 1K0 and 1K1, shown in the drawings, both of which would be lighted at this time since transistors X6 and X7 are both conducting.

A relatively small difference in the potential between the two summation lines 1W1 and 1W0, such as 0.05 volt, will cause the current to be unequally distributed between the transistors X3 and X4. If under these circumstances the input voltage on 1W0 is greater or more positive than 1W1, transistor X3 will conduct almost all of the current which in turn will hold ON transistor X6; but transistor X7 will be turned OFF as the voltage at the base of this transistor rises towards +6 volts. Conversely, if the voltage on the summation output line 1W1 is more positive than that on 1W0, transistors X4 and X7 conduct to provide a "1" output and turn OFF the "0" output. The adjustable resistor 63 in the emitter circuit of transistor X5 provides an adjustment to regulate the amount of sensitivity to which the balance detector unit will respond. Also, an adjustable voltage divider 65 is provided to center the null point within the insensitive zone. In a memory consisting of two banks of 35 units, the minimum difference for two units of weight may be arranged to be of some relatively low voltage such as 0.1 volt, for example, and the insensitive zone may be 0.05 volt on either side of the null point.

The conditioning of the adaptive memory units is accomplished by operation of a conditioning key which in turn controls a conditioning trigger. The output of the conditioning trigger is switched with the alternate outputs of a multivibrator and is supplied along with information from the balance decision units and a training switch input to appropriate logic circuits from whence a signal is supplied to a condition driver circuit which in turn supplies conditioning pulses to each of the adaptive memory units in the particular memory bank. Since all of the circuitry is similar, only one set of conditioning circuits will be described and it will be understood that the remainder are arranged in similar fashion. The conditioning key or switch CK is a spring loaded key which, in its normal condition, causes a conditioning trigger comprising two transistors X8 and X9 to assume one of its two stable states. When the conditioning key is operated, the trigger is switched to its other state and provides an output pulse, returning to its initial state when the key is released. The conditioning key trigger is conventional in construction, constituting a pair of NPN transistors X8 and X9 which are emitter coupled, and which have the biases changed thereon in accordance with the operation of the conditioning key CK. Suitable cross-coupling circuits are provided to insure that the one half of the trigger is turned off while the other is turned on and so forth. The output from the conditioning trigger is supplied to a pair of AND gates or switches, the other inputs to these switches being the alternate outputs of the free-running multivibrator RSG, which is used in the present instance as a random signal generator. The alternately energized conditioning lines, designated COA and COB, are connected to a plurality of AND logic circuits associated with each memory bank. One such logic circuit is shown at 73 and constitutes a plurality of diodes connected to a load resistor and to a suitable source of energy in conventional fashion, so that inputs must be present at each of the three gating diodes in order to provide an output therefrom. The output from the AND circuit 73 is supplied to a conditioning driver indicated by the dotted rectangle 75 and comprising a pair of transistors X10 and X11, connected in such manner that an input pulse supplied from the AND circuit 73 will cause the conditioning driver to provide an output pulse on the conditioning line, such as 1C0 connected thereto.

Sufficient power is provided by this driver to drive all of the adaptive memory units in the bank, in this particular instance, 35. An R-C timing circuit from the collector of transistor X11 to the base of transistor X10 controls the duration of the output pulse so that a pulse of constant width is produced independent of the duration of the input pulse from the AND circuit 73.

The training of this system is under the control of a plurality of training switches, one for each bank, which are designated in binary code fashion. Only one such switch, 1T, is shown, but all are similarly connected. This switch, when closed, establishes a circuit from −12 volts to ground through an associated indication lamp, such as lamp 1TK. With the switch open, the training signal lines, such as 1TS, connected to the switch 1T, have a negative potential supplied thereto through the lamp. When the switch is closed, the lamp is lighted and the potential on the line goes to ground. This difference in potential is supplied directly to AND circuits, such as 85, and is supplied to other AND circuits, such as 73, via an inverter such as 87. The inverter comprises a PNP transistor connected in such manner that the input and output signals are inverted. The remaining input to the AND circuits in the conditioning portion of the system, such as the AND circuits 73 and 85 for the first bank, are supplied from the outputs of the balance decision unit associated with that particular pair of banks; for example, the output signal at terminal 60 from BDU1 is supplied to one of the inputs of AND circuit 85 and the output from BDU1 at terminal 61 is supplied to one of the inputs of AND circuit 73. These outputs also control similar AND circuits for conditioning the B bank. It will be noted that the output from the balance decision unit indicating the "1" condition is fed back to the adaptive memory unit to influence the zero condition weighting while the output from the "0" condition for the balance decision unit 1 is fed back via AND circuit 85 and a conditioning driver 89 to the conditioning line 1C1 which weights the adaptive memory unit AM1A in a positive direction. Similar conditioning circuits with suitable inputs from the associated balance decision units and from the training switches are provided for each of the other pairs of banks in the system.

In adapting a system to distinguish different combinations of inputs, a particular combination of inputs is entered into the memory by appropriately energizing selected elements of the input matrix which, via matrix expansion circuits, are entered into the adaptive memory with the desired output combination set up on the training switches. The conditioning key is then operated and those memory units which indicate an output other than that desired are automatically and randomly conditioned by the signals supplied from the balance decision unit, training switches and the random signal generator via the AND circuits and conditioning drivers to shift the particular input-activated adaptive memory unit or units in the proper direction. A second set of inputs is then supplied to the input matrix and the process is repeated with the training switches being set to provide the selected output for the second set of inputs. After a first run of such training operations, it will be found necessary of course to return and recondition the adaptive memories, since they will shift back and forth during the memory process, and several runs through the learning process will be required before the system will adapt to a particular set of inputs with a particular set of outputs.

FIG. 3 of the drawings shows one form of random signal generator which may be used where the memory banks are divided into more than two groups. This arrangement uses a cascade-connected ring circuit having $n$ stages equal to the number of groups in each of the memory banks. An operating input for the ring is supplied from a noise source NS through an appropriate pulse shaper PS so that randomly occurring noise pulses will cause the ring circuit NSR to have its outputs sequentially energized, but at random intervals. When the condition key CK is operated, the condition key trigger CKT will supply an output to a line which is connected to one input of each of a plurality of AND circuits, the other input of the AND circuits being connected to an appropriate output of an associated stage in ring circuit NSR. The outputs of these AND circuits, such as "COA, COB, COC . . . CO$n$" are supplied to the conditioning circuits for their respective groups of memory units in each of the memory banks. Details of the noise source, the pulse shaper and the ring circuit are not shown since these are conventional and well known in the art. It is apparent that this circuit will provide random outputs to cause energization of the conditioning lines associated with a plurality of adaptive memory units so that the selection operation is on a purely random basis.

The arrangement shown in FIG. 4 is substantially the same as that shown in FIG. 3 except that a ring circuit SRR of the self-running type is used wherein the output is connected to the input to provide a closed type continuously operating ring. This ring continuously supplies outputs in sequential fashion from its cascade-connected stages 1, 2, 3 . . . $n$. These outputs are combined with the condition key trigger signal to energize appropriate AND circuits and thereby provide random conditioning signals to the adaptive memory banks.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An adaptive logic system comprising, in combination, a plurality of adaptive memory units, each capable of being conditioned to selected ones of a plurality of stable states in accordance with input and conditioning signals supplied thereto, input signal means for supplying input signals to said memory units, output signal means connected to said memory units and having outputs thereon determined by the supply of input signals to said memory units after said units have been conditioned, conditioning signal means for supplying conditioning signals to said memory units, conditioning control means for governing said conditioning signal means in accordance with the outputs of said adaptive memory units, and means for rendering said conditioning control means effective to provide conditioning for said memory units on a random selection basis.

2. An adaptive logic system comprising, in combination, a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for supplying input signals to said memory units;

a pair of memory output signal lines connected to the output circuits of all of said memory units;

balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning control means for controlling the conditioning of said memory units to selected conditions in response to input signals, said conditioning means being controlled by said balance detection means to condition said memory units in a direction to displace said units from the condition indicated by said balance detection unit; and means for rendering said conditioning control means effective for selecting said memory units for conditioning on a random basis.

3. An adaptive logic system comprising, in combination, a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;

input means connected to said memory units for supplying input signals to said memory units;

a pair of memory output signal lines connected to the output circuits of all of said memory units;

balance detection means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning means for controlling the conditioning of said memory units to selected conditions in response to input signals, said conditioning means being controlled by said balance detection means to condition said memory units in a direction to displace said units from the condition indicated by said balance detection unit;

training means settable to selected conditions representing desired outputs, said training means governing said conditioning means to render said conditioning means responsive to govern said memory units when a variance exists between the desired output as selected by said training means and the actual output of said memory units as indicated by said balance detecting means; and random signal means for randomly selecting said memory units for conditioning.

4. An adaptive logic system comprising, in combination, a plurality of adaptive memory units, each capable of being conditioned to selected ones of a plurality of stable states and a null condition in accordance with input and conditioning signals supplied thereto, said plurality of units being divided into groups, one group for each output condition of the system to be indicated, each of said groups comprising at least two banks of said memory units, input signal means for supplying input signals to said memory units, conditioning signal means for supplying conditioning signals to said memory units, and output signal means connected to said memory units and having outputs thereon determined by the supply of input signals to said memory units after said units have been conditioned, conditioning control means including random signal generating means for governing the conditioning signal means so that banks of said groups are selected for conditioning on a random basis, but in accordance with the outputs of the adaptive memory units in the associated group.

5. An adaptive logic system as claimed in claim 4 in which the values of the outputs of the adaptive memory units in said stable states have a non-linear weight relationship to each other and the null condition.

6. An adaptive logic system comprising, in combination, a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition, said plurality of units being divided into groups, one group for each output condition of the system to be indicated, each of said groups comprising at least two banks of said memory units;

input means connected to all of said memory units in a group for supplying input signals to said memory units;

a pair of memory output signal lines for each group connected to the output circuits of all of said memory units in the group;

balance detection means for each group connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning means for controlling the conditioning of said memory units to selected conditions in response to input signals, said conditioning means being controlled by said balance detection means to condition said memory units in a direction to displace said units from the condition indicated by said balance detection unit, said conditioning means further including randomly controlled switching means for rendering the conditioning means effective to control the banks of each group of said memory units at random; and means for indicating the first, second and third outputs from said balance detecting means.

7. An adaptive logic system as claimed in claim 6, in which the values of the outputs of the metastable memory units in said stable conditions have a non-linear weight relationship to each other and the neutral condition.

8. In an adaptive logic system of the class employing a plurality of multistate storage units connected to a common output channel, so that the output signal on the channel is the net value of the output signals of said units, the improvement comprising means for rendering the output signals of said units non-linear with respect to the different states which they can assume, and means for conditioning said units by a random selection of the units.

9. An adaptive logic system comprising, in combination, a plurality of metastable memory units having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition, said memory units being divided into groups, one group for each output condition of the total system, each of said groups being divided into at least two banks of units;

input means connected to said memory units for supplying input signals to said memory units;

a pair of memory output signal lines for each group connected to the output circuits of all of said memory units in the group;

balance detection means for each group connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;

conditioning means for controlling the conditioning of said memory units to selected conditions in response to input signals, said conditioning means being controlled by said balance detection means to condition said memory units in a direction to displace said units from the condition indicated by said balance detection unit, said conditioning means further including random signal generating means for randomly selecting the banks in each of said groups for conditioning; and training means settable to selected conditions representing desired outputs, said training means governing said conditioning means to render said conditioning means responsive to govern said memory units when a variance exists between the desired output as selected by said training means and the actual output of said memory units as indicated by said balance detecting means.

10. An adaptive logic system, as claimed in claim 9, said conditioning means being proportioned and arranged so that it displaces the metastable memory units by discrete steps each time said conditioning means is rendered effective.

11. An adaptive logic system as claimed in claim 9 further including conditioning selection means for rendering said conditioning means effective only during a training cycle.

References Cited

UNITED STATES PATENTS

| | | | |
|---|---|---|---|
| 3,022,005 | 2/1962 | Dickinson | 235—152 |
| 3,106,699 | 10/1963 | Kamentsky | 340—172.5 |
| 3,191,150 | 6/1965 | Andrews | 340—172.5 |
| 3,209,328 | 9/1965 | Bonner | 340—172.5 |
| 3,295,103 | 12/1966 | Driese et al. | 340—146.3 |

OTHER REFERENCES

Pages 30–33, Sept. 13, 1961, Corneretto, A., Bionics Efforts Center on Learning Machines, in Electronic Design.

Pages 49–53, Mar. 22, 1963, Crafts, H. S., Components That Learn and How To Use Them, in Electronics.

ROBERT C. BAILEY, *Primary Examiner.*

J. P. VANDENBURG, *Assistant Examiner.*